3,458,677
ANTI-FOAMING ELECTROLYTE FOR LIQUID
LEVEL SWITCH
Joseph P. Leftin, Lynn, Mass., assignor to General
Electric Company, a corporation of New York
No Drawing. Filed Dec. 11, 1967, Ser. No. 689,307
Int. Cl. H01h 29/00, 29/02; H01b 1/00
U.S. Cl. 200—152                                    4 Claims

ABSTRACT OF THE DISCLOSURE

The formation of multiple bubbles resulting in errors in bubble-controlling liquid level electrolyte-containing switches under vibrational conditions is minimized by the use of a silicone antifoaming agent.

---

This invention relates to liquid level switches of improved character. More particularly, it relates to liquid level switches which are not affected by severe vibration.

Liquid level switches containing electrodes and an electrolyte wherein various electrodes to actuate various circuits are contacted by the electrolytic fluid depending upon the attitude of the switch are well known. Such switches are shown, for example, in U.S. Patents 2,367,-465, 2,376,377 and 2,387,313, among others. Generally, such switches consist of a closed electrolyte-containing casing having electrodes therein, a bubble in the surface of the electrolytic fluid shifting as the attitude of the switch varies causing the electrolyte to bridge various electrodes and control electrical circuits as desired. Such liquid level switches which are used in various applications, for example, in attitude and acceleration sensors, have been eminently successful for their intended purpose. However, it has been found that under vibrational conditions as in high speed aircraft and other installations, a number of bubbles tend to form in place of the single original bubble which exists under normally stable conditions. The ability of the switch to accurately control electrical connections depends on the presence of a single bubble of designed size and shape, and it is obvious that the formation of multiple bubbles results in incorrect operation of the electrical circuits. For example, in an attitude indicating installation, the presence of more than one bubble will inaccurately indicate the attitude of the installation as of an aircraft with serious defects upon the operation of the craft and possible disaster.

It is a primary object of this invention to provide liquid level switches of the bubble type which are unaffected by severe vibration and wherein the formation of multiple bubbles is prevented.

Briefly, the present invention consists in the addition to liquid electrolytes for bubble controlling liquid level switches of dimethylpolysiloxane silicone fluid or other compatible material which forms a discrete, immiscible layer on the surface of the electrolyte to prevent the formation of multiple bubbles.

Those features of the invention which are believed to be novel are set forth with particularity in the claims appended hereto. The invention will, however, be better understood and further objects and advantages thereof appreciated from a consideration of the following description.

The teaching of the present invention is applicable to any bubble controlled liquid level switch containing an electrolytic fluid as a current transmitting medium. Such fluids are described in particular in the above-mentioned patents. They often consist of a ketone along with an iodide and iodine. Other suitable electrolytic fluids will occur to those skilled in the art. Generally speaking, electrolytes are designed for suitable conductivity and viscosity characteristics over a wide range of temperatures along with good chemical stability and inertness in relation to the other switch components. While switches containing such electrolytes are accurate under usual conditions, when the vibrational acceleration exceeds about 1 g, tilt errors of one degree or more usually occur due to the formation of multiple bubbles, such bubbles usually disappearing after the vibration stops. At vibration accelerations equal to or over about 4 g, multiple bubbles form which persist even after the vibration ceases with attendant inaccurate readings. It was found that wetting agents of the usual type produced an unacceptable change in electrical conductivity of the electrolyte. However, it was unexpectedly found that if an anti-foaming agent such as one consisting of a silicone of the type described in U.S. Patent 2,469,888 is added to the electrolyte in proportions ranging in volume from about 10 to 250 parts or more per million of total electrolyte, the formation of multiple bubbles such as would cause errors of as much as 0.1 degree was prevented even after severe vibrational acceleration exceeding 4 g and without adversely affecting the conductivity. In actual tests the addition of such agent resulted in attitude readings which were never in error over 0.1 degree, no matter how severe the vibrational acceleration. The silicone used is a clear, water-white, oily liquid comprising dimethylpolysiloxane.

The following examples will illustrate the practice of the present invention, it being realized that they are not to be taken as limiting in any way.

Example 1

A liquid level switch as described in the above patents consisting of a 50–50 by volume blend of diisopropyl ketone and diisobutyl ketone containing about 5 g. sodium iodide and 9 g. iodine per 100 cc. of total electrolyte solution was tested under vibrational conditions for accuracy of reading. It was found that when the vibrational acceleration exceeded about 1 g, tilt errors of one degree or more occurred. At vibration accelerations of over about 4 g, multiple bubbles tended to form and to persist even after vibration ceased and after the electrolytic cell had been deenergized. Such bubbles once formed at lower vibrational accelerations tended to remain up to and through the higher accelerations.

Example 2

Example 1 was repeated with the exception that there was added to the electrolytic fluid 250 parts per million by volume of dimethylpolysiloxane fluid as described above, specifically Viscasil 30,000, based on the total parts by volume of electrolytic fluid. When this fluid was tested in an actual liquid level switch at vibrational accelerations, varying from 1 g to 4 g and above, no multiple bubbles formed at any time and at no time was the error indication more than 0.1 degree. It is felt that the addition of the dimethylpolysiloxane fluid forms a discrete, immiscible layer on the surface of the electrolyte so that bubbles formed under vibrational conditions are not homogeneous.

There are provided, then, by the present invention bubble controlled electrolyte-containing liquid level indicating switches in which the controlling bubble and the electrolyte remain stable even under severe vibrational acceleration.

What I claim as new and desire to secure by Letters Patent of the United States is:

1. In a bubble controlled liquid level switch having a closed casing containing a liquid electrolyte and electrodes adapted to contact said electrolyte depending upon the position of a bubble in the surface of the electrolyte, the improvement in which an anti-foaming agent is added to said electrolyte to minimize the formation of multiple bubbles under severe vibrational stress.

2. A liquid level switch as in claim 1 wherein said anti-foaming agent is present in an amount ranging in volume from about 10 to 250 parts per million of electrolyte fluid.

3. A liquid level switch as in claim 1 wherein said anti-foaming agent comprises dimethylpolysiloxane.

4. A liquid level switch as in claim 2 wherein said anti-foaming agent comprises dimethylpolysiloxane.

References Cited

UNITED STATES PATENTS 2,764,653   9/1956   Schoeppel et al.

ROBERT K. SCHAEFER, Primary Examiner

H. J. HOHAUSER, Assistant Examiner

U.S. Cl. X.R.

252—500